Patented May 27, 1952

2,598,049

UNITED STATES PATENT OFFICE 2,598,049

PRODUCTION OF ARYLOXYALKYL HALIDES

William K. T. Gleim, Orland Park, Ill., assignor to Universal Oil Products Company, Chicago, Ill., a corporation of Delaware No Drawing. Application December 30, 1949, Serial No. 136,153

8 Claims. (Cl. 260—613)

This invention relates to aryloxyalkyl halides and to a process for producing these compounds. More specifically, the process relates to certain aryloxypropyl chlorides and to a novel method for producing them.

An object of this invention is to produce a 1-aryloxy-3-chloroalkane.

Another object of this invention is to produce a 1-aryloxy-3-chloropropane.

A further object of this invention is to produce 1-phenoxy-2-methyl-3-chloropropane.

One specific embodiment of this invention relates to a process for producing an aryloxy-3-haloalkane which comprises reacting a hydrogen halide selected from the group consisting of hydrogen chloride and hydrogen bromide in the presence of an antioxidant with an organic compound represented by the formula

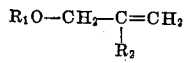

in which $R_1$ represents a member of the group consisting of a phenyl group, an alkylphenyl group, a hydroxyphenyl group, a hydroxyalkylphenyl group, an alkoxyphenyl group, and an allyloxyphenyl group, and $R_2$ represents a member of the group consisting of a hydrogen atom and an alkyl group.

I have found that in the presence of an antioxidant like hydroquinone, etc., hydrogen bromide, or hydrogen chloride, adds to the double bond of an arylallyl ether in a manner contrary to that generally expected. I have found that the halogen atom such as a bromine atom or a chlorine atom adds to the carbon atom which is already combined with two hydrogen atoms and the hydrogen of the hydrogen halide adds to the other end of the double bond, that is, to the tertiary carbon atom. The result of this unexpected manner in which the hydrogen halide adds to an allyl group of the above-mentioned compound, is the production of an aryloxy-3-haloalkane, namely, a compound containing a primary halogen atom rather than one containing a tertiary halogen atom.

Thus the hydrogen halide addition reaction of this process in the presence of an antioxidant such as hydroquinone, methoxyphenol, other suitable reducing agents, etc., may be represented by the equation

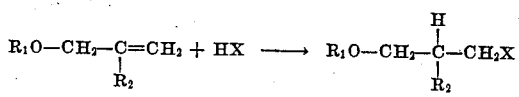

in which $R_1$ represents an aryl group selected from the members of the group, consisting of a phenyl group, an alkylphenyl group, a hydroxyphenyl group, a hydroxyalkylphenyl group, an alkoxyphenyl group, and an allyloxyphenyl group, $R_2$ represents a member of the group consisting of a hydrogen atom and an alkyl group, and X represents a halogen atom selected from the members of the group consisting of bromine and chlorine.

The aryloxyalkyl halides formed by this process are useful as intermediates in the synthesis of dyes, pharmaceuticals, nonionic detergents, etc.

The addition of a hydrogen halide such as hydrogen bromide or hydrogen chloride to an aryloxyallyl ether may be carried out in acetic acid solution at a temperature of from about —50° to about +50° C. and preferably at a temperature of from about —25° to about +25° C. The process may be carried out using either batch or continuous types of operation after which the resultant reaction products are separated into unconverted starting material and the desired hydrohalogenated reaction product.

The nature of this invention is illustrated further by the following examples which should not be misconstrued to limit unduly the generally broad scope of the invention.

*Example I*

Di-β-methallyl ether of hydroquinone was dissolved in glacial acetic acid containing some hydroquinone and into the resultant solution gaseous hydrogen chloride was conducted at 20° C. Addition of hydrogen chloride to the double bonds of the dimethallylether of hydroquinone yielded 1,4-di-(3'-chloro-2'-methyl)propoxybenzene which was a well crystallized compound having a melting point of 78°–79° C. and a chlorine content of 23.8% by weight which was in good agreement with a calculated value of 24.4% for two chlorine atoms per molecule.

When some of this compound and hydroquinone were refluxed together for four hours in the presence of sodium methylate used as a catalyst to form an ether with hydroquinone, all of the starting material was recovered unchanged. This recovery of the unconverted chlorine containing starting material was evidence of the presence of a primary alkyl chloride rather than a tertiary alkyl chloride.

*Example II*

1-methoxy-4-(3'-chloro-2'-methyl)-propoxybenzene was obtained by reacting hydrogen chloride at a temperature of 20°–25° C. with the methallyl ether of p-hydroxyanisole in glacial acetic acid solution and in the presence of hydroquinone. A crystallized compound M. P. 43°–44° C. was afforded, which when refluxed with silver acetate, yielded the theoretical amount of AgCl.

Cl calc. 16.3%; found 15.8%.

Mol. weight calc. 215; found 235.

This treatment with silver acetate yielded 95% of the acetic acid ester. This is further proof that the chlorine present was attached to a primary carbon atom and not to a tertiary carbon atom. Tertiary alcohol esters of acetic acid are not prepared readily by refluxing tertiary alkyl halides with silver acetate.

I claim as my invention:

1. A process for producing an aryloxy-3-haloalkane which comprises reacting a hydrogen halide selected from the group consisting of hydrogen chloride and hydrogen bromide in the presence of an antioxidant with an organic compound represented by the formula:

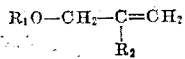

in which $R_1$ represents a member of the group consisting of a phenyl group, an alkylphenyl group, a hydroxyphenyl group, a hydroxyalkylphenyl group, an alkoxyphenyl group, and an allyloxyphenyl group, and $R_2$ represents a member of the group consisting of a hydrogen atom and an alkyl group.

2. A process for producing an aryloxy-3-chloropropane which comprises reacting hydrogen chloride and a β-methallyl aryl ether in the presence of an antioxidant.

3. A process for producing an aryloxy-3-chloropropane which comprises reacting hydrogen chloride and a β-methallyl aryl ether in the presence of a hydroquinone antioxidant.

4. A process for producing 1,4-di(3'-chloro-2'-methyl)-propoxybenzene which comprises reacting the β-dimethallyl ether of hydroquinone with hydrogen chloride in the presence of hydroquinone.

5. A process for producing 1-methoxy-4-(3'-chloro-2'-methyl)-propoxybenzene which comprises reacting the β-methallyl ether of p-hydroxyanisole with hydrogen chloride in the presence of hydroquinone.

6. 1,4 - di - (3'-chloro-2'-methyl) -propoxybenzene.

7. 1-methoxy - 4 - (3'-chloro-2'-methyl) -propoxybenzene.

8. The process as defined in claim 1 further characterized in that said hydrogen halide and said organic compound are reacted in the presence of a hydroquinone antioxidant.

WILLIAM K. T. GLEIM.

REFERENCES CITED

The following references are of record in the file of this patent:

UNITED STATES PATENTS

| Number | Name | Date |
|---|---|---|
| 2,159,364 | Coleman et al. | May 23, 1939 |